US007616913B2

United States Patent
Matsui et al.

(10) Patent No.: US 7,616,913 B2
(45) Date of Patent: Nov. 10, 2009

(54) CHARGING ROLLER CLEANING DEVICE WITH GUIDING PORTION AND IMAGE FORMING DEVICE HAVING SAME

(75) Inventors: Toshiyuki Matsui, Kanagawa (JP); Tomoya Ichikawa, Kanagawa (JP); Masayuki Kono, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 123 days.

(21) Appl. No.: 11/633,457

(22) Filed: Dec. 5, 2006

(65) Prior Publication Data

US 2007/0286635 A1 Dec. 13, 2007

(30) Foreign Application Priority Data

Jun. 12, 2006 (JP) ............................. 2006-162604

(51) Int. Cl.
G03G 15/02 (2006.01)
(52) U.S. Cl. .................................... 399/100
(58) Field of Classification Search ................ 399/100, 399/101, 174, 176
See application file for complete search history.

(56) References Cited

U.S. PATENT DOCUMENTS

| 6,173,142 B1 * | 1/2001 | Kawakami ................. 399/175 |
| 7,415,237 B2 | 8/2008 | Okoshi ........................ 399/350 |
| 2005/0214021 A1 * | 9/2005 | Friedrich et al. ............. 399/101 |
| 2006/0067727 A1 * | 3/2006 | Suda et al. ................... 399/100 |
| 2006/0099005 A1 * | 5/2006 | Kitazawa et al. ............. 399/100 |
| 2007/0166083 A1 | 7/2007 | Satoh et al. .................. 399/323 |
| 2008/0056757 A1 * | 3/2008 | Honobe et al. ............... 399/100 |

FOREIGN PATENT DOCUMENTS

| JP | A-2-272594 | 11/1990 |
| JP | 2001-235994 A | 8/2001 |
| JP | A-2003-228264 | 8/2003 |
| JP | 2005338578 A * | 12/2005 |
| KR | 10-2006-0103083 | 9/2006 |
| KR | 10-2007-0046781 | 5/2007 |

* cited by examiner

Primary Examiner—Quana M Grainger
(74) Attorney, Agent, or Firm—Morgan, Lewis & Bockius LLP

(57) ABSTRACT

A cleaning device includes a cleaning roller, a supporting portion and a guiding portion. The cleaning roller has a core and a cleaning member provided around the core, the cleaning member contacting and cleaning a charging roller by rotation of the cleaning roller, the charging roller charging an image carrier carrying an image. The supporting portion supports the core rotatably in a state in which the cleaning member is in contact with the charging roller. The guiding portion movably guides the core, which is supported by the supporting portion, in a direction different from a direction of a straight line passing through a rotational center of the charging roller and a rotational center of the cleaning roller.

14 Claims, 9 Drawing Sheets

FIG.8

| | GUIDING DIRECTION OF GUIDING PORTION | FIRST CONTACTING PORTION Rz | SECOND CONTACTING PORTION Rz | CLEANING ROLLER SHAFT Rz | CLEANING PERFORMANCE AT TIME OF START-UP OF ROTATION | CLEANING PERFORMANCE AT TIME OF CONTINUED ROTATION (WHEN FOREIGN MATTER ENTERS) |
|---|---|---|---|---|---|---|
| COMPARATIVE EXAMPLE | SAME DIRECTION AS A STRAIGHT LINE CONNECTING ROTATIONAL CENTERS OF CHARGING ROLLER AND CLEANING ROLLER | 3 μm | 3 μm | 1.5 μm | × | × |
| EXAMPLE (1) | A DIRECTION INCLINED BY 45° WITH RESPECT TO A STRAIGHT LINE CONNECTING ROTATIONAL CENTERS OF CHARGING ROLLER AND CLEANING ROLLER | 3 μm | 3 μm | 1.5 μm | ○ | △ |
| EXAMPLE (2) | IBID | 3 μm | 8 μm | 1.5 μm | ○ | ○ |
| EXAMPLE (3) | IBID | 3 μm | 12 μm | 1.5 μm | ○ | ○ |

○ : POOR CLEANING DOES NOT ARISE
△ : POOR CLEANING SLIGHTLY ARISES
× : POOR CLEANING ALWAYS ARISES

CHARGING ROLLER CLEANING DEVICE WITH GUIDING PORTION AND IMAGE FORMING DEVICE HAVING SAME

BACKGROUND

1. Technical Field

The present invention relates to a cleaning device having a cleaning roller which cleans a charging roller which charges an image carrier, and to an image forming device, such as a copier or a printer or the like, which employs an electrophotographic method and is equipped with the cleaning device.

2. Related Art

Devices utilizing corona discharge development, such as scorotron chargers, have often been used as charging devices of image forming devices such as copiers or printers or the like which employ an electrophotographic method. In contrast, the contact-charging method, which carries out charging of an image carrier by causing a conductive charging roller to directly contact an image carrier, has become the mainstream method recently because the power source efficiency thereof as well is good.

In such a contact-charging method charging device, there is the problem that, because the charging roller is always contacting the image carrier, it is easy for contamination to arise due to foreign matter adhering to the surface of the charging roller. At the downstream side of the transfer process, the surface of an image carrier on which the image forming operation is repeatedly carried out undergoes a cleaning process which removes foreign matter such as residual toner and the like after the transfer, and thereafter enters into the area of the charging process. However, even after going through the cleaning process, minute particles which are smaller than the toner, such as portions of the toner or external additives of the toner or the like, remain on the image carrier without being cleaned, and adhere to the surface of the charging roller. The foreign matter adhering to the surface of the charging roller causes non-uniformity in the surface resistance value of the charging roller, and abnormal discharging or unstable discharging occurs, and the uniformity of charging deteriorates.

SUMMARY

According to an aspect of the present invention, there is provided a cleaning device including: a cleaning roller that has a core and a cleaning member provided around the core, the cleaning member contacting and cleaning a charging roller by rotation of the cleaning roller, the charging roller charging an image carrier carrying an image; a supporting portion supporting the core rotatably in a state in which the cleaning member is in contact with the charging roller; and a guiding portion movably guiding the core, which is supported by the supporting portion, in a direction different from a direction of a straight line passing through a rotational center of the charging roller and a rotational center of the cleaning roller.

BRIEF DESCRIPTION OF THE DRAWINGS

Exemplary embodiments of the present invention will be described in detail based on the following figures, wherein:

FIG. 8 is a table showing cleaning performance in the first and second exemplary embodiments of the present invention.

DETAILED DESCRIPTION

An image forming device relating to exemplary embodiments of the present invention will be described hereinafter with reference to the drawings.

(Structure of Image Forming Device)

Figure 1:
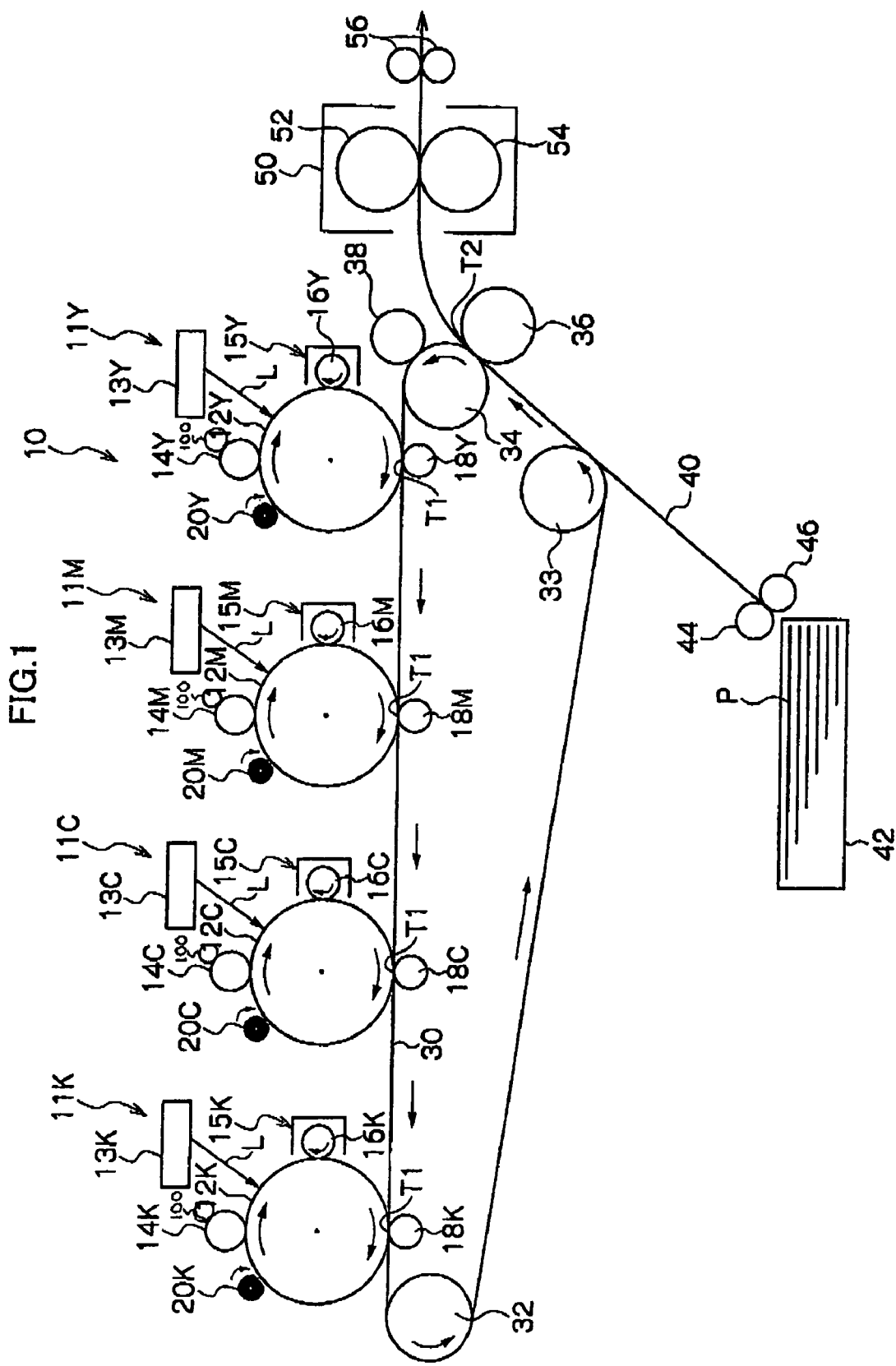
FIG. 1 is a structural diagram showing the schematic structure of an image forming device relating to exemplary embodiments of the present invention.

An image forming device 10 of the exemplary embodiments of the present invention which is shown in FIG. 1 is a quadruple-tandem-type color copier. As shown in FIG. 1, image forming units 11 (11Y, 11M, 11C, 11K), which form toner images of the respective colors of yellow (Y), magenta (M), cyan (C), and black (K), are lined-up along the moving direction of an intermediate transfer belt 30.

Photosensitive drums 12 (12Y, 12M, 12C, 12K) serving as image carriers are provided at the image forming units 11. For example, conductive, cylindrical-tube-shaped bodies, whose surfaces are covered by photosensitive layers formed from organic photoconductors or the like, are used as the photosensitive drums 12. The photosensitive drums 12 are driven by motors to rotate at a predetermined processing speed in the directions of the arrows (i.e., so as to rotate rightward) in FIG. 1.

Charging devices having charging rollers (contact chargers) 14 (14Y, 14M, 14C, 14K), which charge the surfaces of the photosensitive drums 12, are disposed substantially directly above the photosensitive drums 12. Exposure devices 13 (13Y, 13M, 13C, 13K), which irradiate laser lights L onto the surfaces of the photosensitive drums 12 charged by the charging devices and form electrostatic latent images, are disposed further above the photosensitive drums 12.

Developing devices 15 (15Y, 15M, 15C, 15K) are disposed adjacent to the photosensitive drums 12 at the right sides thereof. Developing rollers 16 (16Y, 16M, 16C, 16K), which develop the electrostatic latent images formed on the photosensitive drums 12 into toner images of the respective colors of Y, M, C, K, are provided at the developing devices 15.

The intermediate transfer belt 30, which is endless and on which are transferred the toner images made visible by the developing devices 15, is disposed beneath the photosensitive drums 12. Primary transfer rollers 18 (18Y, 18M, 18C, 18K) are disposed so as to oppose the photosensitive drums 12, with the intermediate transfer belt 30 nipped therebetween. The respective contacting portions of the photosensitive drums 12 and the intermediate transfer belt 30 are primary transfer portions T1. A primary transfer bias which is positive is applied to the primary transfer rollers 18.

Photosensitive body cleaners, which remove the transfer residual toner remaining on the photosensitive drums 12 after the primary transfer, are disposed adjacent to the photosensitive drums 12 at the left sides thereof. Brush rollers 20 (20Y, 20M, 20C, 20K) are provided at the photosensitive body cleaners. The brush rollers 20 press-contact the outer peripheral surfaces of the photosensitive drums 12, are driven to rotate in the direction opposite the direction of rotation of the photosensitive drums 12, and rub the transfer residual toner off of the photosensitive drums 12.

The intermediate transfer belt 30 is trained around a driving roller 32, a stretching roller 33, and a secondary transfer back-up roller 34, and rotates (moves) in the direction of the arrows synchronously with the rotation of the photosensitive drums 12. Further, the above-described image forming units 11Y, 11M, 11C, 11K are lined-up in series in that order with respect to the direction of movement of the intermediate transfer belt 30. In this way, the toner images on the photosensitive drums 12 are primarily-transferred onto the intermediate transfer belt 30 at the respective primary transfer portions T1 by the primary transfer rollers 18 so as to be superposed one on another in the order of yellow, magenta, cyan, black. The intermediate transfer belt 30 conveys this primarily-transferred toner image toward a secondary transfer portion T2 (secondary transfer roller 36) which will be described hereafter.

The secondary transfer roller 36 is disposed opposingly at the right side of the intermediate transfer belt 30, such that a sheet conveying path 40 is nipped therebetween. The contacting portion of the secondary transfer roller 36 and the intermediate transfer belt 30 is the secondary transfer portion T2. A secondary transfer bias which is negative is applied to the secondary transfer roller 36. In this way, the secondary transfer roller 36 is assisted by the secondary transfer back-up roller 34, and secondarily-transfers, onto a sheet P and at the secondary transfer portion T2, the toner image which was primarily-transferred on the intermediate transfer belt 30. Further, an intermediate transfer belt cleaner 38, which removes the transfer residual toner remaining on the intermediate transfer belt 30 after the secondary transfer, is provided above and to the right of the secondary transfer back-up roller 34 which rotates and supports the intermediate transfer belt 30.

A sheet feed tray 42, in which the sheets P are accommodated, is disposed beneath the intermediate transfer belt 30. A feed roller 44, which feeds the sheets P out from the sheet feed tray 42 to the sheet conveying path 40, and a retard roller 46, which separates one-by-one the sheets P which are fed-out, are provided in a vicinity of the right side of the sheet feed tray 42.

A fixing device 50, which has a heating roller 52 and a pressurizing roller 54 which oppose one another, is disposed at the sheet conveying path 40 at the downstream side of the secondary transfer portion T2. A pair of discharging rollers 56 are provided at the downstream side of the fixing device 50. The sheet conveying path 40 extends from the feed roller 44 and the retard roller 46, through the secondary transfer portion T2 and the fixing device 50, to the discharging rollers 56.

(Image Forming Operation of Image Forming Device)

The color image forming operation by the image forming device 10 of the exemplary embodiments of the present invention will be described next.

When an image formation signal is inputted to the image forming device 10 and the photosensitive drums 12 are driven to rotate, the charging rollers 14 rotate in accordance with the rotation of the photosensitive drums 12, and the surfaces (outer peripheral surfaces) of the photosensitive drums 12 are charged uniformly by the charging rollers 14. Then, the laser lights L are illuminated from the exposure devices 13 onto the surfaces of the photosensitive drums 12 on the basis of the image formation signal. The surfaces of the photosensitive drums 12 are exposed by these laser lights L, and electrostatic latent images are formed.

The electrostatic latent images formed on the photosensitive drums 12 are developed into toner images of the respective colors of yellow, magenta, cyan, and black by the developing rollers 16 of the developing devices 15, and are primarily-transferred onto the intermediate transfer belt 30 at the primary transfer portions T1 so as to be superposed one on another. Further, the transfer residual toner which remains on the photosensitive drums 12 after the primary transfer is rubbed-off and removed by the brush rollers 20 of the cleaning devices.

On the other hand, the sheet P accommodated in the sheet feed tray 42 is fed-out by the feed roller 44, and is separated by the retard roller 46 such that only the uppermost sheet P is guided to the sheet conveying path 40. The sheet P is fed-in between the secondary transfer roller 36 and the secondary transfer back-up roller 34, i.e., to the secondary transfer portion T2, at a predetermined timing. At this secondary transfer portion T2, the toner image, which has been primarily-transferred onto the intermediate transfer belt 30, is secondarily-transferred onto the sheet P. The sheet P on which the toner image has been transferred is conveyed along the sheet conveying path 40 to the downstream side and is guided to the fixing device 50, and the toner image is fixed by the heat and pressure of the heating roller 52 and the pressurizing roller 54. Then, the sheet P, on which an image has been formed by the fixing of the toner image, is discharged-out to a catch tray by the discharging rollers 56.

The transfer residual toner, which remains on the image region of the intermediate transfer belt 30 after the secondary transfer, is rubbed-off and removed by the intermediate transfer belt cleaner 38. Further, cleaning rollers 100 (see FIG. 2) rotate in accordance with the aforementioned rotation of the charging rollers 14, and the contamination (foreign matter), such as toner and external additives and the like adhering to the surfaces of the charging rollers 14, is cleaned-off by the cleaning rollers 100. Then, this foreign matter is taken-in into the cells of the foam of the cleaning rollers 100. When the foreign matter recovered within the cells coheres and becomes a proper size, the foreign matter is returned from the cleaning rollers 100 to the photosensitive drums 12 via the charging rollers 14, and is recovered at the photosensitive body cleaners by the brush rollers 20 which clean the photosensitive drums 12. The cleaning performance is thereby maintained and continued. Due to the above-described operations, a color image is formed on the sheet P by the image forming device 10.

(Structure of Charging Roller and Cleaning Roller)

The charging rollers 14 provided at the image forming device 10 having the above-described structure, and the cleaning rollers 100 which clean the charging rollers 14, will be described in detail next.

Figure 2:
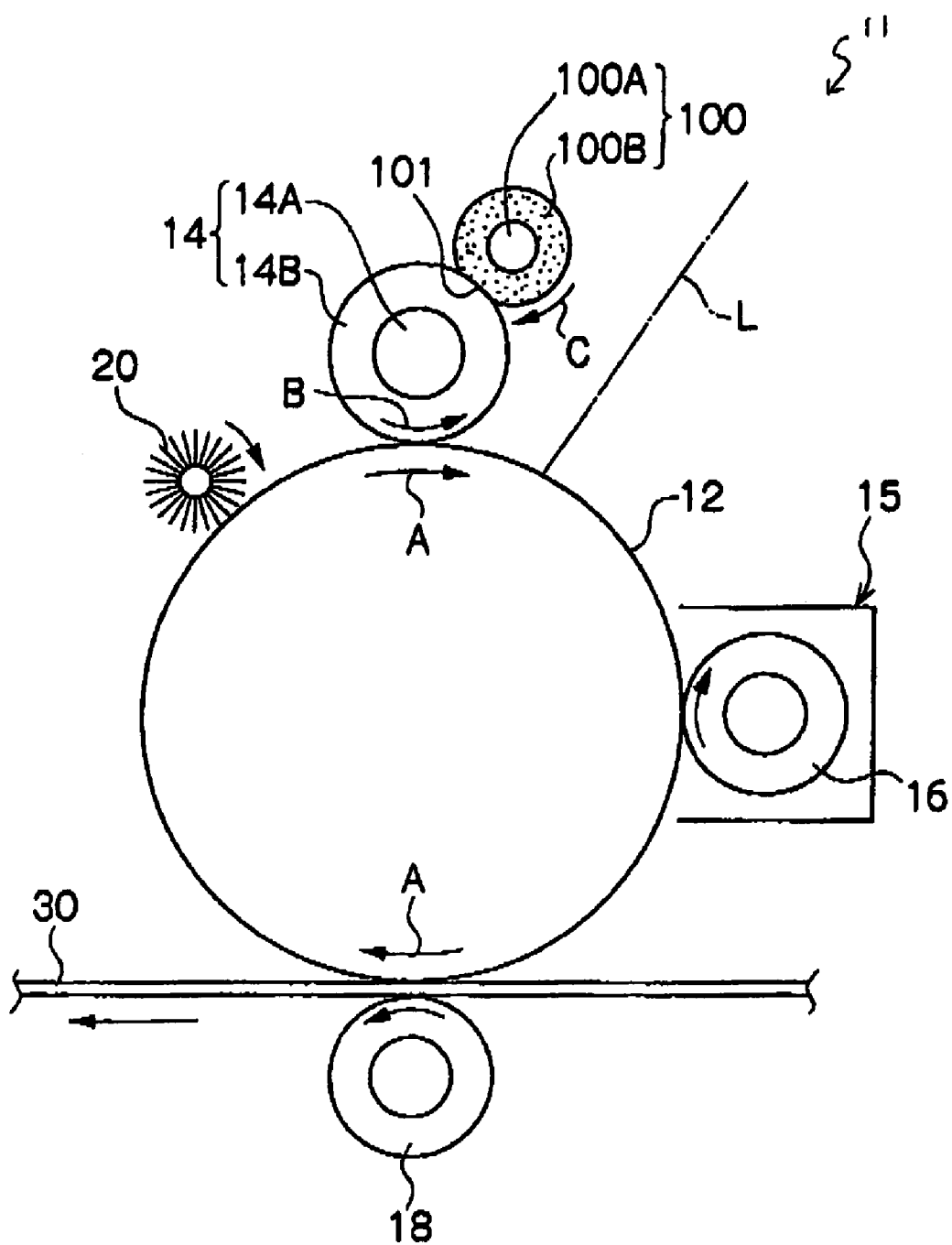
FIG. 2 is an enlarged view showing the structure of a photosensitive drum, a charging roller, and a cleaning roller provided in the image forming device of FIG. 1.

As shown in FIG. 2, the charging roller 14 is disposed above the photosensitive drum 12 so as to contact the photosensitive drum 12. The charging roller 14 is a structure in which a charging layer 14B is formed on the periphery of a conductive shaft 14A, and the shaft 14A is supported rotatably. The cleaning roller 100, which is a roller-shaped cleaning component which contacts the surface of the charging roller 14, is provided at the upper right of the charging roller 14. The cleaning roller 100 is a structure in which a sponge layer 100B is formed on the periphery of a shaft 100A, and the shaft 100A is supported rotatably.

The cleaning roller 100 is pressed against the charging roller 14 by its own weight, and the sponge layer 100B elastically deforms along the peripheral surface of the charging roller 14 so as to form a nip portion 101. The photosensitive drum 12 is driven by a motor so as to rotate in the direction of arrow A in FIG. 2 (clockwise), and the charging roller 14 rotates in the direction of arrow B (counterclockwise) in accordance with the rotation of the photosensitive drum 12. Further, the cleaning roller 100 rotates in the direction of arrow C (clockwise) in accordance with the rotation of the charging roller 14.

Here, the charging roller (BCR) 14 and the cleaning roller 100 of the exemplary embodiments of the present invention will be described.

As described above, the charging roller 14 is disposed so as to contact the surface of the photosensitive drum 12, and dc voltage, or a voltage in which ac voltage is superimposed on dc voltage, is applied to the charging roller 14, and the charging roller 14 charges the surface of the photosensitive drum 12. With regard to the configuration thereof, the charging roller 14 is shaped as a roller in which a resistant elastic layer structuring the charging layer 14B is provided on the periphery of a core structuring the shaft 14A. The resistant elastic layer may be structured so as to be divided into a resistant layer and an elastic layer which supports it, in that order from the outer side. Further, a protective layer can be provided on the outer side of the resistant layer as needed, in order to provide the charging roller 14 with durability and contamination-resistance.

A case in which an elastic layer, a resistant layer, and a protective layer are provided on a core will be described in further detail hereinafter.

The material of the core is conductive, and generally, iron, copper, brass, stainless steel, aluminum, nickel, or the like is used. Materials other than metals may be used provided that they are materials which are conductive and have a proper degree of rigidity. For example, resin molded products in which conductive particles or the like are dispersed, or ceramics, or the like may be used. Further, other than the shape of a roller, the shape of a hollow pipe may be used.

The material of the elastic layer is conductive or semiconductive, and generally is a material in which conductive particles or semiconductive particles are dispersed in a resin material or a rubber material. Synthetic resins, such as polyester resin, acrylic resin, melamine resin, epoxy resin, urethane resin, silicon resin, urea resin, polyamide resin, and the like, or the like may be used as the resin material. Ethylenepropylene rubber, polybutadiene, natural rubber, polyisobutylene, chloroprene rubber, silicon rubber, urethane rubber, epichlorohydrin rubber, fluorosilicone rubber, ethylene oxide rubber, and the like, or foamed materials in which these materials are foamed, may be used as the rubber material.

Carbon black, metals such as zinc, aluminum, copper, iron, nickel, chromium, titanium and the like, metal oxides such as $ZnO-Al_2O_3$, $SnO_2-Sb_2O_3$, $In_2O_3-SnO_2$, $ZnO-TiO_2$, $MgO-Al_2O_3$, $FeO-TiO_2$, $TiO_2$, $SnO_2$, $Sb_2O_3$, $In_2I_3$, $ZnO$, $MgO$ and the like, ionic compounds such as quaternary ammonium salts and the like, and the like may be used as the conductive particles or semiconductive particles. A single type of these materials may be used, or two or more types may be mixed-together and used. Further, one type or two or more types of inorganic fillers such as talc, alumina, silica, and the like, or organic fillers such as fine powders of fluorine resin or silicon rubber, or the like, may be mixed-together as needed.

The materials of the resistant layer and the protective layer are materials in which conductive particles or semiconductive particles are dispersed in a binder resin, and the resistance thereof is controlled. The resistivity is $10^3$ to $10^{14}$ Ωcm, and preferably $10^5$ to $10^{12}$ Ωcm, and more preferably $10^7$ to $10^{12}$ Ωcm. The film thickness is 0.01 to 1000 μm, and preferably 0.1 to 500 μm, and more preferably 0.5 to 100 μm. Acrylic resin, cellulose resin, polyamide resin, methoxymethylated nylon, ethoxymethylated nylon, polyurethane resin, polycarbonate resin, polyester resin, polyethylene resin, polyvinyl resin, polyarylate resin, polythiophene resin, polyolefin resins such as PFA, FEP, PET and the like, styrene-butadiene resin, melamine resin, epoxy resin, urethane resin, silicon resin, urea resin, or the like is used as the binder resin.

One type or two or more types of carbon black, metals, metal oxides, or ionic compounds such as quaternary ammonium salts or the like which manifest ion conductivity, such as those listed above in relation to the elastic layer, or the like are mixed-together as the conductive particles or the semiconductive particles. Further, one type or two or more types of antioxidants such as hindered phenol, hindered amine, and the like, inorganic fillers such as clay, kaolin, talc, silica, alumina, and the like, organic fillers such as fine powders of fluorine resin or silicon resin, or the like, lubricants such as silicone oil or the like, and the like may be added as needed. Surfactants, charge controlling agents, and the like also are added as needed.

Blade coating, Meyer bar coating, spray coating, immersion coating, bead coating, air knife coating, curtain coating, or the like can be used as the method for forming these layers.

The cleaning roller 100 is formed from a core (holding member) structuring the shaft 100A, and a porous elastic layer structuring the sponge layer 100B which is formed at the peripheral surface of the core. As mentioned previously, the cleaning roller 100 is disposed so as to contact the surface of the charging roller 14.

A material, which is rigid to the extent that it can hold the porous elastic layer and can maintain the state of contact with the charging roller 14 with a proper press-contact force, is used as the material of the core. Generally, in addition to metals such as iron, copper, brass, stainless steel, aluminum, nickel and the like, resin molded products, ceramics, and the like, materials in which conductive particles or the like are dispersed in such materials, and materials in which inorganic fillers are dispersed, can be used. Further, other than the shape of a roller, the core may be shaped as a hollow pipe.

The porous elastic layer is a roller-shaped sponge which is formed to have a predetermined cell density For example, ether-based urethane foam, ester-based urethane foam, polyethylene foam, polyolefin foam, melamine foam, micropolymer, or the like can be used.

To briefly describe the manufacturing method by using polyurethane foam as an example, polyol, isocyanate, water, a catalyst (an amine catalyst, a metal catalyst, or the like), and a foam stabilizer (surfactant) are used, and further, additives such as pigment or the like are used depending on the application. Then, when these raw materials are mixed-together and stirred, a chemical reaction takes place, and a foam of urethane resin can be obtained.

In the exemplary embodiments of the present invention, at the cleaning roller 100, the shaft 100A (core) is formed of stainless steel, and the sponge layer 100B (porous elastic layer) is formed of a foamed urethane resin. Note that the shaft 100A may be formed from an insulating resin (acrylic resin, epoxy resin, polyamide resin, or the like). In this case, it is preferable that the volume resistance of the insulating resin material be greater than or equal to $10^{14}$ Ωcm, in order to prevent contamination and the like due to local discharged charges.

(Structure of Supporting Structure)

The supporting structure of the charging roller 14 and the cleaning roller 100 relating to a first exemplary embodiment of the present invention will be described next.

Figure 3:
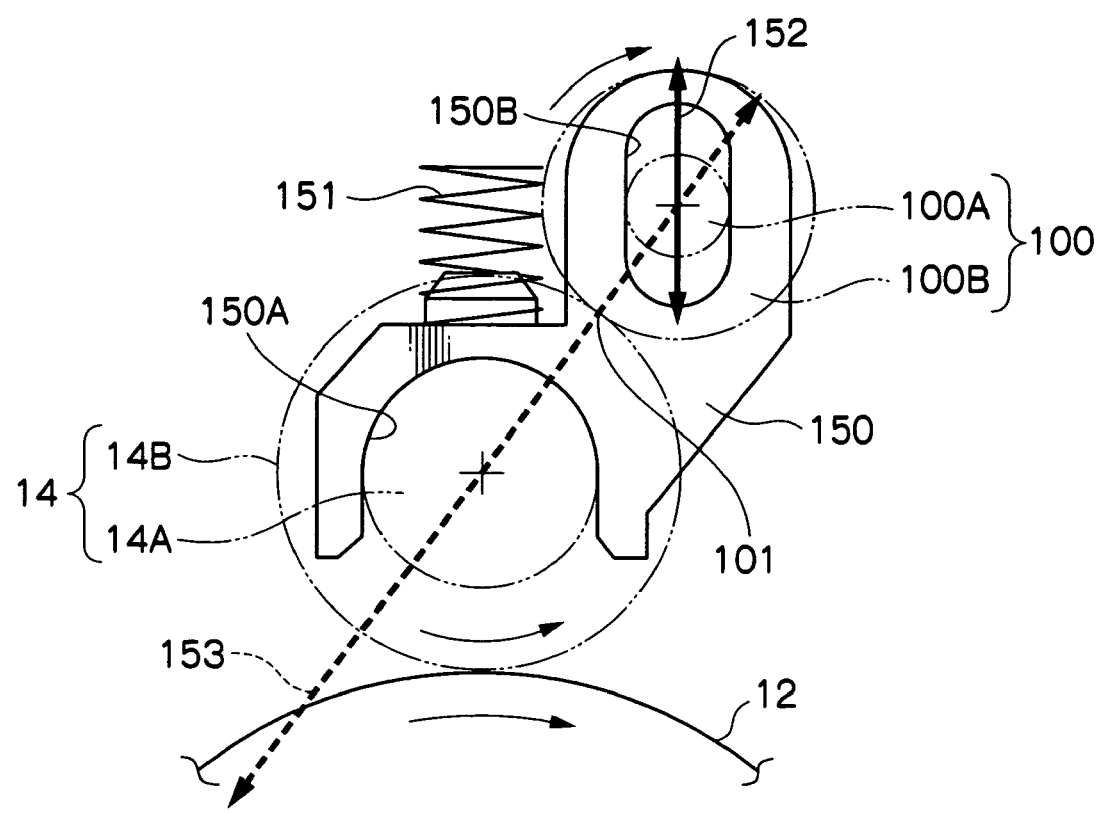
FIG. 3 is a schematic structural diagram showing a first exemplary embodiment of the present invention.
Figure 4:
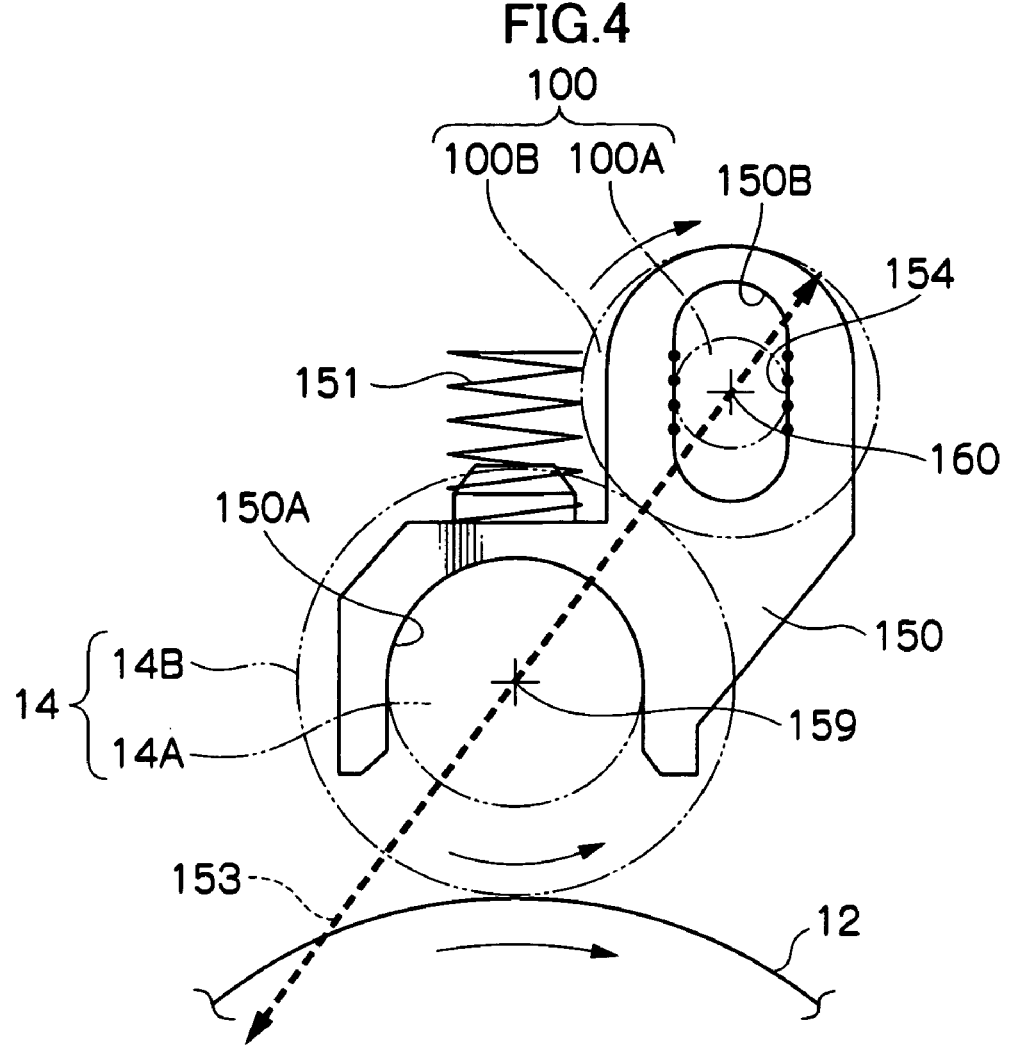
FIG. 4 is a schematic structural diagram supplementing explanation of the first exemplary embodiment of the present invention.

As shown in FIGS. 3 and 4, in the exemplary embodiments of the present invention, the charging roller 14 and the cleaning roller 100 are assembled, at the axial direction both end portions thereof, to a pair of supporting members 150, and are made into a unit in a form which includes these supporting members 150, and are disposed at a predetermined position with respect to the photosensitive drum 12. The photosensitive drum 12 and the charging roller 14 contact one another along the axial direction, and the charging roller 14 and the cleaning roller 100 contact one another along the axial direction. Here, in the structures of the exemplary embodiments of the present invention, the cleaning roller 100 is disposed at the side opposite the photosensitive drum 12, with the charging roller 14 therebetween. However, the cleaning roller 100 and the photosensitive drum 12 are not disposed at directly opposite (180° opposite) positions, and at least the position of contact between the charging roller 14 and the cleaning roller 100 is disposed at a position approaching the photosensitive drum 12 on the circumference of the charging roller 14.

Two shaft-receiving holes 150A, 150B, which are disposed at a predetermined interval, are formed in the supporting member 150. An end portion of the shaft 14A of the charging roller 14 is freely-rotatably inserted in the one shaft-receiving hole 150A, and an end portion of the shaft 100A of the cleaning roller 100 is freely-rotatably inserted in the other shaft-receiving hole 150B. Here, the shaft-receiving hole 150B is formed, for example, in the shape of a long hole, and the shaft 100A of the cleaning roller 100 is supported with a predetermined number of degrees of freedom. Further, due to the supporting members 150 being pushed by spring members 151, the charging roller 14 abuts the surface of the photosensitive drum 12 with a predetermined pressure.

Note that the supporting members 150 of the exemplary embodiments of the present invention are formed of a synthetic resin material such as polyacetal, polycarbonate, or the like which has high rigidity, good slidability, and excellent wear-resistance. In order to further improve the wear-resistance, glass fibers or carbon fibers or the like may be included in the synthetic resin material.

As described above, the charging roller 14, at which the end portions of the shaft 14A are pivotally-supported at the pair of supporting members 150, and the cleaning roller 100, at which the end portions of the shaft 100A are pivotally-supported at the pair of supporting members 150, are in a state in which the cleaning roller 100 is pressed against the charging roller 14 due to its own weight, such that the sponge layer 100B elastically deforms along the peripheral surface of the charging roller 14 and forms the nip portion 101 (see FIG. 2).

The shaft 100A of the cleaning roller 100 can move in a guiding direction 152 of the shaft-receiving holes 150B which function as guiding portions. The guiding direction 152 is disposed so as to be a direction which is different than a direction 153 of a straight line which connects a rotational center (159 in FIG. 4) of the charging roller 14 and a rotational center (160 in FIG. 4) of the cleaning roller 100. Therefore, side surfaces (154 in FIG. 4) of the shaft-receiving holes 150B restrain the shaft 100A of the cleaning roller at a predetermined angle. Here, for example, in a case in which a slight positional fluctuation of about 50 μm, such as shaking of the outer periphery of the charging roller 14, arises at the nip portion 101, the side surfaces 154 of the shaft-receiving holes 150B restrain the shaft 100A, and, therefore, the cleaning roller 100 is not guided and moved. Accordingly, the aforementioned positional fluctuation can be absorbed by the sponge 100B compressing at the nip portion 101.

In contrast, in a case in which foreign matter or the like which is larger than 50 μm and which has entered in the image forming device 10 further enters into the nip portion 101, in addition to the compressing of the sponge layer 100B at the nip portion 101, the side surfaces 154 of the shaft-receiving holes 150B guide and move the shaft 100A of the cleaning roller 100 upward. Therefore, it is possible to prevent the charging roller 14 and the cleaning roller 100 from being damaged greatly at the nip portion 101.

A second exemplary embodiment of the present invention will be described next.

Figure 5:
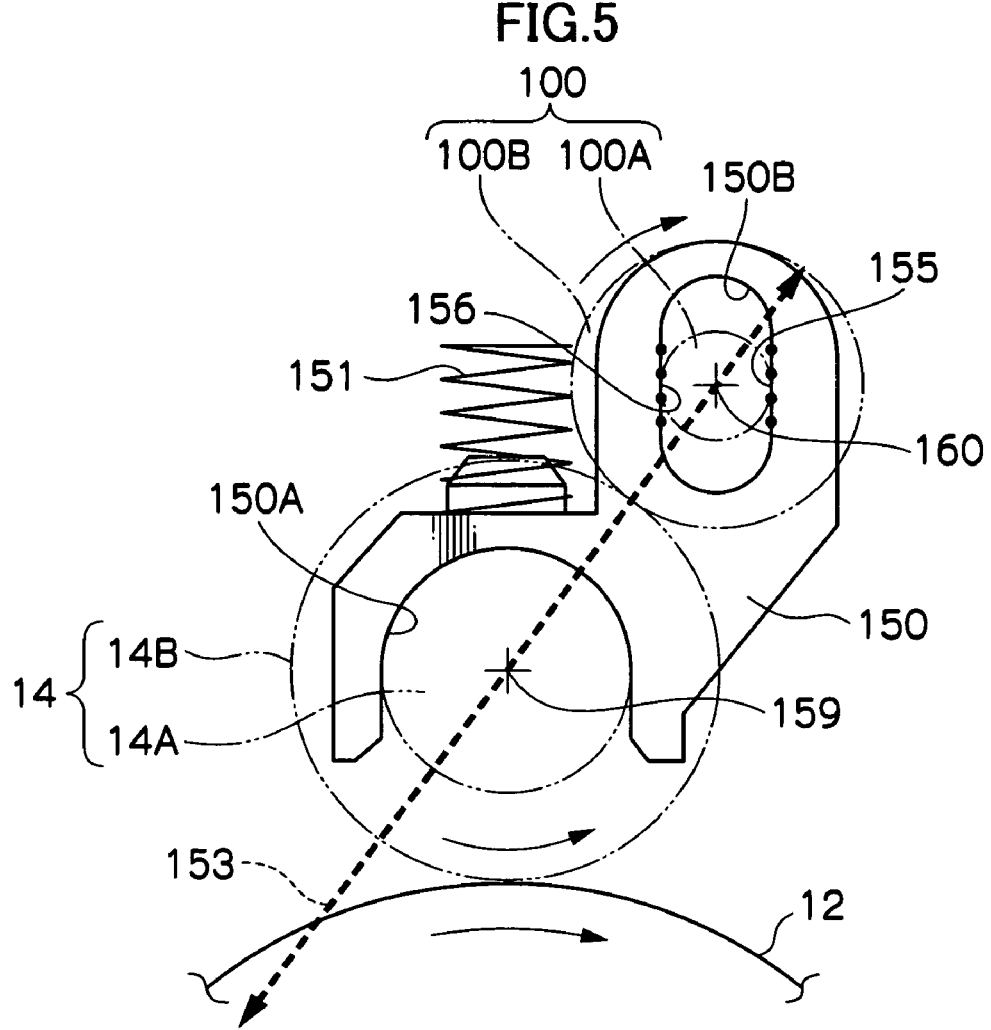
FIG. 5 is a schematic structural diagram showing a second exemplary embodiment of the present invention.

As shown in FIG. 5, the second exemplary embodiment differs from the first exemplary embodiment with respect to the point that, at a first contacting portion 155 and a second contacting portion 156 at the side surfaces of the shaft-receiving hole 150B, the respective ten-point average roughnesses (JIS) thereof are made to be different by subjecting the surfaces to polishing processing or blasting processing or the like, or in the molding thereof.

Here, if the difference between the outer diameter of the shaft 100A of the cleaning roller 100 and the short diameter of the shaft-receiving hole 150B (i.e., the distance between the first contacting portion 155 and the second contacting portion 156) is set at a tolerance of about 50 μm, when the charging roller 14 and the cleaning roller 100 are in the midst of rotating, the shaft 100A is urged toward the second contacting portion 156 at a predetermined pressure due to the rotational torque of the cleaning roller 100, and contacts the first contacting portion 155 at a pressure which is weaker than at the second contacting portion 156. Further, if the difference between the outer diameter of the shaft 100A and the short diameter of the shaft-receiving hole 150B is set to be greater than 100 μm, the second contacting portion 156 and the shaft 100A are in a state of non-contact.

Here, if the ten-point surface average roughness (JIS B0651: 1996) of the first contacting portion 155 is set to be greater than that of the second contacting portion 156, at the time of starting-up of the rotation of the charging roller 14, when the cleaning roller 100 starts to spring-up in the guiding direction 152 of the shaft-receiving hole 150B, the shaft 100A of the cleaning roller 100 slidingly-rubs against the surface of the first contacting portion 155, and the springing-up can be suppressed.

If the surface roughness of the second contacting portion 156 is set to be high, the rotational load of the cleaning roller 100 is high steadily, and poor rotation arises. Accordingly, by making the roughness of the second contacting portion 156 to be relatively low, because the shaft 100A of the cleaning roller 100 starts to spring-up at the first contacting portion 155 side where the contact pressure at the time of stopping is low, the surface roughness of the first contacting portion 155 works. Poor initial cleaning when the charging roller rotates can thereby be prevented.

Figure 9:
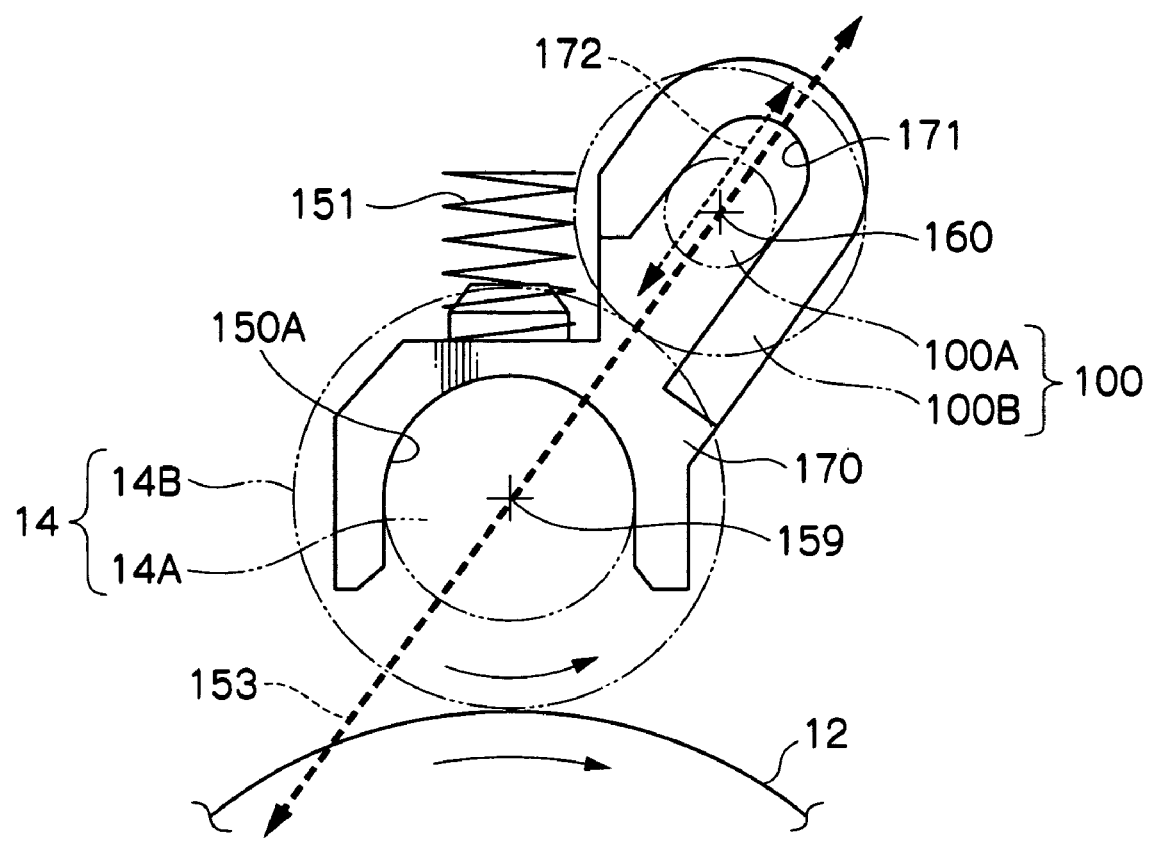
FIG. 9 is a schematic structural diagram showing a conventional supporting portion of a charging roller and a cleaning roller.

Examples of the first and second exemplary embodiments will be described hereinafter. In the present examples, the supporting members 150 are structured by using the aforementioned polycarbonate. The charging roller 14 is formed by layering a rubber layer, which is formed from isoprene rubber and has a thickness of 4 mm, on a metal shaft of φ8. The resistance of the rubber layer is set to be $10^{6.8}$ Ω. For the cleaning roller 100, a structure is used in which a foamed urethane layer of a thickness of 2.5 mm is formed on a metal shaft of φ5. Evaluation is carried out on Example (1) (see FIGS. 3 and 4) in which the guiding direction at guiding portions having the same surface roughnesses (Rz) is made to intersect the direction of a straight line connecting the rotational centers of the charging roller 14 and the cleaning roller 100, and Example (2) and Example (3) in which the surface roughness (Rz) of the second contacting portions 156 in Example (1) is varied, as compared with a Comparative Example (see FIG. 9) having supporting members (170) in which the ten-point surface average roughnesses (JIS B0651: 1996) of contacting portions corresponding to the first contacting portion 155 and the second contacting portion 156 of the supporting members 150 are each made to be Rz 3 μm, and the direction (153) of the straight line connecting the rotational center (159) of the charging roller 14 and the rotational center (160) of the cleaning roller 100, and a guiding direction (172) of guiding portions (171), are made to coincide with one another. Note that, in Example (2), the surfaces are polished and formed such that the first contacting portions (155) are Rz 3 μm and the second contacting portions (156) are Rz 8 μm. In Example (3), the surfaces are polished and formed such that the first contacting portions (155) are Rz 3 μm and the second contacting portions (156) are Rz 12 μm. The ten-point surface average roughness (JIS B0651: 1996) of the shaft 100A is Rz 1.5 μm.

The aforementioned ten-point surface average roughnesses (JIS B0651: 1996) are measured by the following method. Using the Surfcom-590A manufactured by Tokyo Seimitsu Co., Ltd., with the pick-up stylus E-DT-S01A and under the settings of JIS'82, the measuring length is 3 mm, the measuring speed is 0.3 mm/s, the cut-off wavelength is 0.6 mm, and the cut-off type is 2CR (phase compensation).

Using the four types of supporting members 150, 170 of the Comparative Example, Example (1), Example (2), and Example (3), the charging roller is rotated at a surface speed of 210 mm/sec, and the performance of cleaning the toner particles adhering to the surface of the charging roller is evaluated. The results are shown in FIG. 8. In the Comparative Example, the cleaning roller 100 springs-up when the driving of the charging roller 14 starts, and even after the rotation stabilizes, the cleaning roller 100 is affected by shaking of the outer periphery of the charging roller 14, and the cleaning performance progresses as is in an unstable manner. In contrast, in Examples (1), (2) and (3), the aforementioned springing-up of the cleaning roller 100 is prevented, the cleaning roller 100 is not affected by shaking of the outer periphery, and cleaning can be continued stably. In particular, in Examples (2) and (3), poor cleaning does not arise during evaluation.

A third exemplary embodiment of the present invention will be described next.

Figure 6:
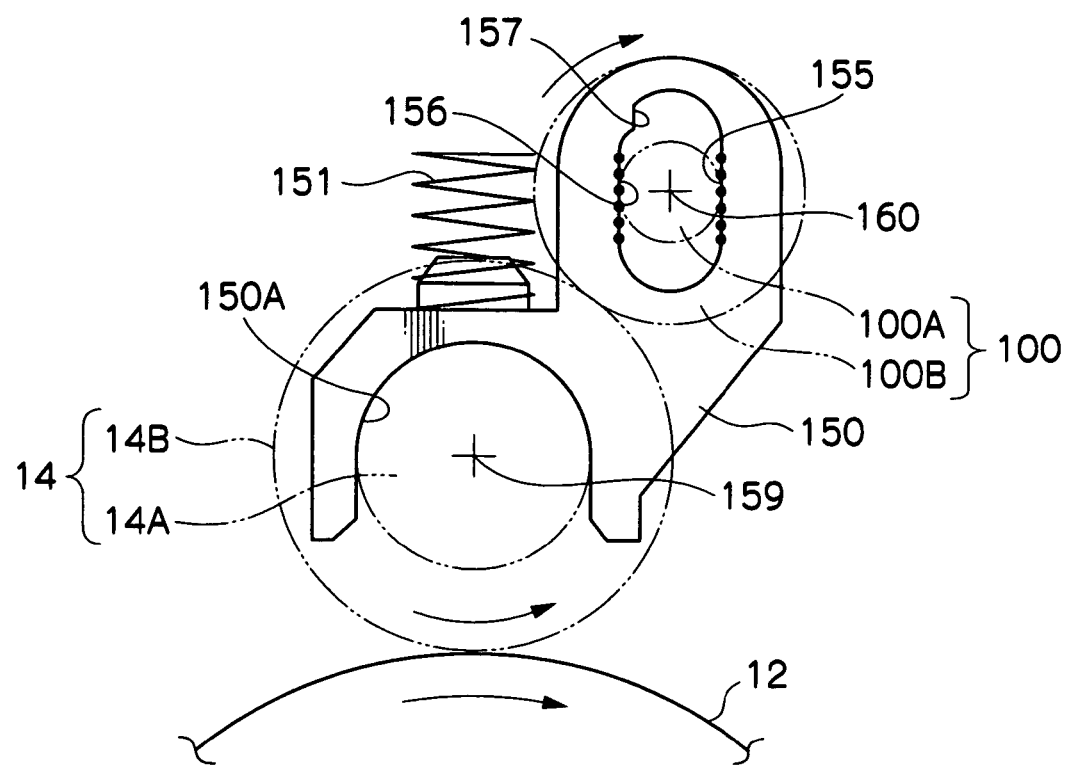
FIG. 6 is a schematic structural diagram showing a third exemplary embodiment of the present invention.

As shown in FIG. 6, the third exemplary embodiment differs from the second exemplary embodiment with respect to the point that a core regulating portion 157 is provided so as to project-out from the second contacting portion 156. As mentioned previously, at the time when rotation of the charging roller 14 starts-up, the cleaning roller 100 receives the rotational torque of the charging roller 14, and it is easy for the phenomenon of the cleaning roller 100 springing-up to occur initially. Here, due to the core regulating portion 157 projecting-out at the upper portion of the second contacting portion 156, which is at the downstream side in the direction of rotation of the cleaning roller 100 as seen from the nip portion 101, the shaft 100A of the cleaning roller 100 which springs-up easily is restricted, and problems such as poor cleaning and the like can be suppressed. Results of carrying out an evaluation similar to that of the previous second exemplary embodiment confirm that a similar, stable cleaning performance is maintained.

By setting the distance between the second contacting portion 156 and the core regulating portion 157 to be approximately the maximum shaking of the outer periphery of the charging roller 14 (e.g., 50 μm), positional fluctuations due to shaking of the outer periphery of the charging roller 14 are such that springing-up at the time when foreign matter enters into the nip portion 101, or when the charging roller 14 starts-up, can be prevented, although movement in the guiding direction 152 is permitted.

A fourth exemplary embodiment of the present invention will be described next.

Figure 7:
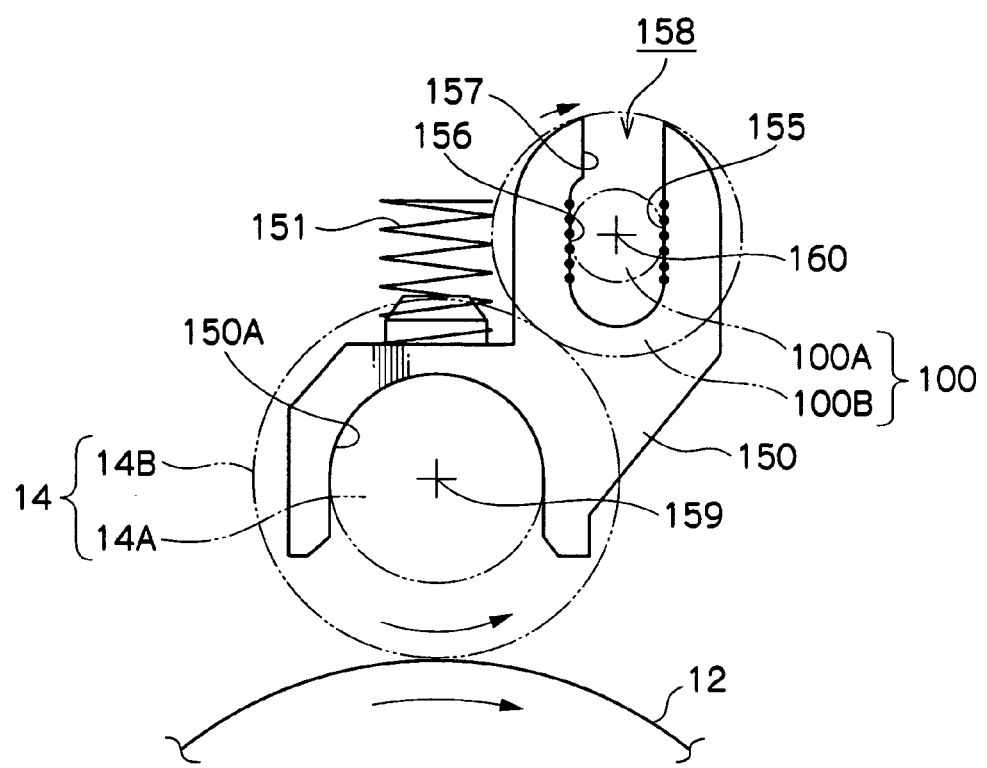
FIG. 7 is a schematic structural diagram showing a fourth exemplary embodiment of the present invention.

As shown in FIG. 7, the fourth exemplary embodiment differs from the third exemplary embodiment with respect to the point that a core insertion portion 158, into which the shaft 100A of the cleaning roller 100 is inserted, is provided between the first contacting portion 155 and the second contacting portion 156. In this case, because the cleaning roller 100 can be installed at the supporting members 150 from above, the assemblability improves. Further, the portion where the above-described core regulating portion 157 projects-out is set to be more narrow than the diameter of the shaft 100A. In this way, the cleaning roller 100 is installed by elastic deformation of the core regulating portions 157, and thereafter, the core regulating portions 157 can also function to prevent the cleaning roller 100 from coming out of place.

Further, as illustrated, the shaft-receiving holes 150A for the charging roller 14 as well are open downwardly and structure shaft-receiving portions. Therefore, the charging roller 14, the supporting members 150, and the cleaning roller 100 can be easily assembled in that order.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A cleaning device comprising:
   a cleaning roller that comprises a core and a cleaning member provided around the core, the cleaning member contacting and cleaning a charging roller by rotation of the cleaning roller, the charging roller charging an image carrier carrying an image;
   a supporting portion supporting the core rotatably in a state in which the cleaning member is in contact with the charging roller; and
   a guiding portion movably guiding the core, which is supported by the supporting portion, in a direction different from a direction of a straight line passing through a rotational center of the charging roller and a rotational center of the cleaning roller, wherein
   the guiding portion has a first contacting portion, which contacts a peripheral surface of a first side portion of the core, and a second contacting portion, which contacts a peripheral surface of a second side portion of the core, and the first side portion and the second side portion are at opposing sides of the core,
   the first contacting portion contacts the peripheral surface at a side which is far from the charging roller as compared with the second contacting portion, and the first contacting portion and the second contacting portion contact the core at the same time.

2. The cleaning device of claim 1, wherein a ten-point average roughness of the first contacting portion is greater than a ten-point average roughness of the second contacting portion.

3. The cleaning device of claim 1, further comprising a movement regulating member which regulates movement of the core in a guiding direction of moving away from the charging roller.

4. The cleaning device of claim 1, wherein an insertion portion, for insertion of the core into the guiding portion along a direction of guiding by the guiding portion, is provided at the supporting portion.

5. An image forming device comprising:
a charging roller to carry toner corresponding to an image to be transferred to a sheet;
a fixing device to fix the toner corresponding to the image onto the sheet; and
a cleaning device to clean the charging roller, wherein the cleaning device includes:
a cleaning roller that comprises a core and a cleaning member provided around the core, the cleaning member contacting and cleaning the charging roller by rotation of the cleaning roller, the charging roller charging an image carrier carrying an image;
a supporting portion supporting the core rotatably in a state in which the cleaning member is in contact with the charging roller; and
a guiding portion movably guiding the core, which is supported by the supporting portion, in a direction which is different from a direction of a straight line passing through a rotational center of the charging roller and a rotational center of the cleaning roller, wherein
the guiding portion has a first contacting portion, which contacts a peripheral surface of a first side portion of the core, and a second contacting portion, which contacts a peripheral surface of a second side portion of the core, and the first side portion and the second side portion are at opposing sides of the core,
the first contacting portion contacts the peripheral surface at a side which is far from the charging roller as compared with the second contacting portion, and
the first contacting portion and the second contacting portion contact the core at the same time.

6. The cleaning device of claim 2 further comprising a movement regulating member which regulates movement of the core in a guiding direction of moving away from the charging roller.

7. The cleaning device of claim 2 wherein an insertion portion, for insertion of the core into the guiding portion along a direction of guiding by the guiding portion, is provided at the supporting portion.

8. The image forming device of claim 5 further comprising a movement regulating member which regulates movement of the core in a guiding direction of moving away from the charging roller.

9. The image forming device of claim 5, wherein an insertion portion, for insertion of the core into the guiding portion along a direction of guiding by the guiding portion, is provided at the supporting portion.

10. The image forming device of claim 5, wherein a ten-point average roughness of the first contacting portion is greater than a ten-point average roughness of the second contacting portion.

11. A cleaning device comprising:
a cleaning roller that comprises a core and a cleaning member provided around the core, the cleaning member contacting and cleaning a charging roller by rotation of the cleaning roller, the charging roller charging an image carrier carrying an image;
a supporting portion supporting the core rotatably in a state in which the cleaning member is in contact with the charging roller; and
a guiding portion movably guiding the core, which is supported by the supporting portion, in a direction different from a direction of a straight line passing through a rotational center of the charging roller and a rotational center of the cleaning roller, wherein
the guiding portion has a first contacting portion, which contacts a peripheral surface of a first side portion of the core, and a second contacting portion, which contacts a peripheral surface of a second side portion of the core, and the first side portion and the second side portion are at opposing sides of the core,
the first contacting portion contacts the peripheral surface at a side which is far from the charging roller as compared with the second contacting portion, and
a ten-point average roughness of the first contacting portion is greater than a ten-point average roughness of the second contacting portion.

12. An image forming device comprising:
a charging roller to carry toner corresponding to an image to be transferred to a sheet;
a fixing device to fix the toner corresponding to the image onto the sheet; and
a cleaning device to clean the charging roller, wherein the cleaning device includes:
a cleaning roller that comprises a core and a cleaning member provided around the core, the cleaning member contacting and cleaning the charging roller by rotation of the cleaning roller, the charging roller charging an image carrier carrying an image;
a supporting portion supporting the core rotatably in a state in which the cleaning member is in contact with the charging roller; and
a guiding portion movably guiding the core, which is supported by the supporting portion, in a direction which is different from a direction of a straight line passing through a rotational center of the charging roller and a rotational center of the cleaning roller, wherein
the guiding portion has a first contacting portion, which contacts a peripheral surface of a first side portion of the core, and a second contacting portion, which contacts a peripheral surface of a second side portion of the core, and the first side portion and the second side portion are at opposing sides of the core,
the first contacting portion contacts the peripheral surface at a side which is far from the charging roller as compared with the second contacting portion, and
a ten-point average roughness of the first contacting portion is greater than a ten-point average roughness of the second contacting portion.

13. The cleaning device of claim 11 further comprising a movement regulating member which regulates movement of the core in a guiding direction of moving away from the charging roller.

14. The cleaning device of claim 11, wherein an insertion portion, for insertion of the core into the guiding portion along a direction of guiding by the guiding portion, is provided at the supporting portion.

* * * * *